C. B. McAULAY.
UNLOADER VALVE.
APPLICATION FILED AUG. 6, 1913.

1,110,567.

Patented Sept. 15, 1914.

UNITED STATES PATENT OFFICE.

CHESTER B. McAULAY, OF SAN FRANCISCO, CALIFORNIA, ASSIGNOR TO THE PELTON WATER WHEEL COMPANY, OF SAN FRANCISCO, CALIFORNIA, A CORPORATION OF CALIFORNIA.

UNLOADER-VALVE 1,110,567.  Specification of Letters Patent.  Patented Sept. 15, 1914.

Application filed August 6, 1913. Serial No. 783,370.

*To all whom it may concern:*

Be it known that I, CHESTER B. McAULAY, a citizen of the United States, residing in the city and county of San Francisco and State of California, have invented certain new and useful Improvements in Unloader-Valves, of which the following is a specification.

The present invention relates to unloader valves particularly designed to be employed in fluid pressure systems wherein a fluid is maintained at all times under pressure and wherein the flow of fluid from the pressure producing means to the pressure accumulating chamber is by passed to the reservoir on the pressure in the system becoming too great, thereby permitting the flow of fluid from the pump to be returned to the reservoir from where it is again forced back into the system under pressure, when the pressure therein falls below normal, and the invention has for its principal objects to provide a pressure operated valve which will open its full distance with great rapidity to provide a full opening for the escape of the fluid from the pressure producing means, and when the pressure in the accumulating chamber is reduced will close very rapidly to cut off the flow of the fluid from the pressure producing means to the reservoir, thereby reducing to a minimum the heating of the fluid when the same escapes from the pressure producing means through the valve; to provide a valve which is automatically controlled by the variations of pressure in the system, and one which is capable of adjustment to open and close under different fluid pressures.

With the above mentioned and other objects in view, the invention consists in the novel construction and combination of parts hereinafter described, illustrated in the accompanying drawings and pointed out in the claims hereto appended, it being understood that various changes in the form, proportion, size and minor details of construction within the scope of the claims may be resorted to without departing from the spirit or sacrificing any of the advantages of the invention.

To more fully comprehend the invention, reference should be had to the accompanying sheet of drawings wherein one form of my invention is disclosed as connected to a pump and in communication with a suitable reservoir and storage tank, and in which—

Figure 1:
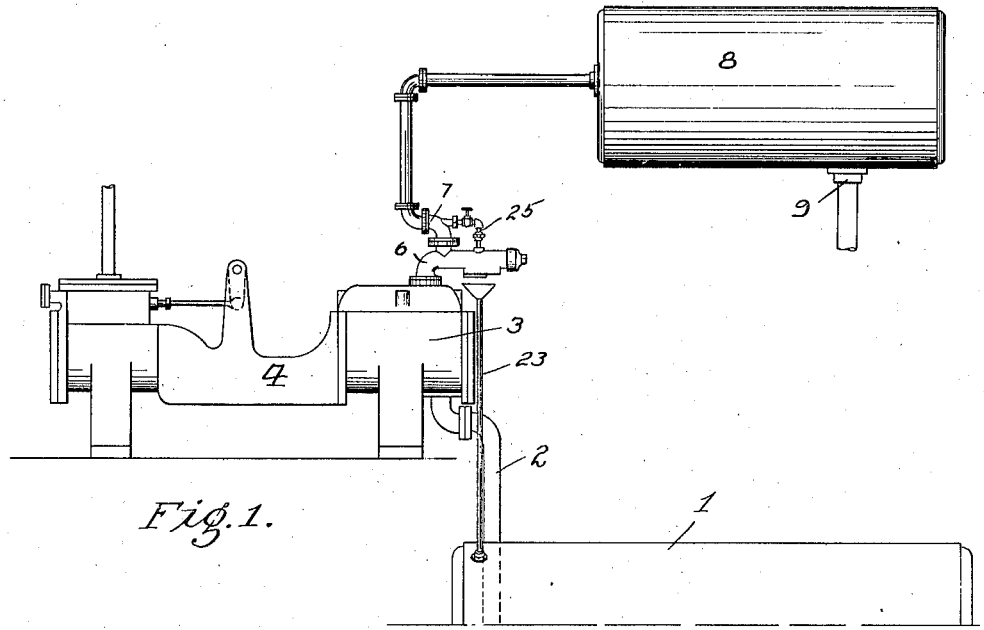
Figure 2:
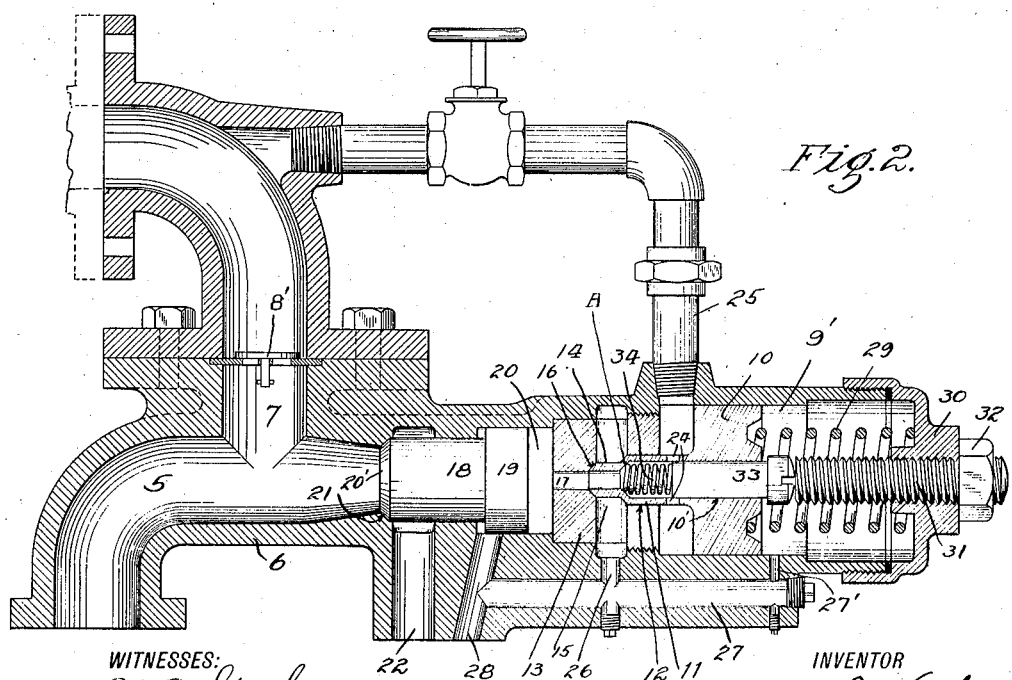

Figure 1 is a view in elevation of my invention as connected to a pump, disclosing the reservoir, the connection between the same and the pump, the pressure chamber and the connection between the same and the valve casing, and the return connection from the valve casing to the reservoir. Fig. 2 is an enlarged longitudinal sectional view of the valve, disclosing the channels therein leading to the pump and to the pressure chamber, the floating valve open at one end to the action of the pressure from the pump, the by pass controlled by said valve, and leading to the reservoir, the pressure controlled piston for controlling the opening and closing of said floating valve, and the spring pressed means associated with said piston.

Referring more particularly to the drawings, wherein like characters of reference designate corresponding parts throughout the several views, the reference numeral 1 designates a suitable reservoir adapted to contain a fluid such as oil, which is connected by a pipe 2 with the pumping cylinder 3 of a suitable pump 4, and for purposes of illustration, I have disclosed a steam pump. Communicating with the interior of the cylinder 3 to receive the fluid under pressure from the pump is the channel 5 of a suitable tubular valve casing 6, and from said channel branches a channel 7 which connects with a pressure chamber 8 into which the fluid is pumped and maintained under a uniform pressure, and from said chamber there leads an outlet 9 which conveys the fluid to any suitable place where it is used under pressure. A check valve 8' is positioned in the channel 7 to permit the fluid to flow from the pump into the chamber 8, and to prevent any back flow thereof into the channel 5. Slidably mounted in a chamber 9' in the rear end of the tubular valve casing 6 is a suitable piston 10 provided with a central bore 10' therein and formed at one end with an outwardly projecting centrally arranged tubular extension 11, which operates through an opening 12 in a member 13, which is threaded into the tubular portion of the valve casing, and the outer end of said tubular extension 11 is contracted, as at 14, operates through a channel 15 in the member 13, and is adapted to be seated in a beveled seat 16 in the member 13, the bore 10' of said extension 11 and contracted portion 14 are adapted to aline with and control a suitable channel 17 in the member 13. Slidably mounted in the valve casing 6 between the member 13 and the channel 5 is a fluid operated valve 18, the enlarged end 19 of which is positioned in a chamber 20 adjacent the channel 17, and the smaller beveled end 20' of which is adapted to be received in a corresponding seat 21 and control the passage of the fluid from the channel 5 to a return channel 22, formed in the casing 6, and which is connected by a return connection 23 leading to the reservoir 1.

The extension 11 is formed with suitable apertures 24 therein which communicate with the bore 10' formed on the interior thereof, and through said apertures is admitted fluid under pressure, which is conveyed through the valve controlled connection 25 which connects the channel 7 with the casing 6 between the rear wall of the member 13 and the front face of the piston 10. The fluid under pressure from the connection 25 enters the apertures 24, flows through the bore in the extension 11 and when the contracted end thereof is in its seat 16, passes through the bore 17 into the chamber 20, and the pressure of the fluid against the enlarged portion 19 of the valve 18 retains the outer contracted end thereof in its seat 21 against the pressure of the fluid in the channel 5.

A fluid escape outlet 26 communicates with the channel 15 in the member 13, and communicates with a channel 27, which intersects a channel 28 which communicates at one end with the return connection 23 leading to the reservoir 1, and at its opposite end communicates with the chamber 20 in advance of the enlarged rear portion 19 of the valve 18. A channel 27' connects the chamber 9' with the channel 27 and permits the escape therefrom of any leakage fluid.

The piston 10 is normally retained in its forwardmost position to maintain the contracted portion 14 against its seat 16, by a coiled spring 29, which abuts against an adjustable threaded closure 30 fitted over the rear end of the casing 6, and said spring surrounds a threaded member 31 which extends through the closure 30 and is retained in its adjusted position therein by a nut 32 fitted over the rear end thereof. A cylindrical controlling member 33 is mounted in the rear portion of the bore 10', and the rear end thereof is forced into engagement with the forward end of the threaded member 31 by a coiled spring 34 mounted in the tubular extension 11.

From the above description it will be apparent that by adjusting the threaded member 31, the end of the controlling member 33 may be adjusted relative to the apertures 24 to require a great or little movement of the piston to draw the apertures over the controlling member, in order that the same will shut off the flow of the fluid through the apertures to the enlarged surface of the valve 18.

Assuming that the parts are in the position as in the drawings, and the pump is operating to draw fluid from the reservoir 1 and force the same under pressure into the pressure chamber 8, the device operates in the following manner:—

The fluid under pressure will flow through the valve controlled connection 25, through the apertures 24 into the bore 10', through the channel 17 into the chamber 20 where it acts on the enlarged rear surface 19 of the valve 18 maintaining the beveled seat 20' thereof in its seat 21, and preventing the escape of the fluid under pressure from the channel 5 to the return channel 22. As long as the communications 24 are unobstructed, equal fluid pressures will be maintained on either side of the valve 18, but the greater area thereof being exposed to the pressure in the chamber 20 will maintain the smaller end of said valve seated. Should the pressure in the pressure chamber 8 rise above normal, which is regulated by the adjustment of the cap 30 to vary the tension of the spring 29, the pressure of the fluid will act on the forward face of the piston and force the same rearwardly against the tension of the spring 29, and the movement of the piston will draw the apertures 24 over the end of the controlling member 33 and cut off the flow of fluid to the chamber 20.

On the rearward movement of the piston, the end of the contracted portion 14 will be disengaged from its seat 16, which will open a communication from the chamber 20 through the bore 17 into the chamber 15, and the pressure of the fluid from the channel on the outer end of the valve will rapidly force the same rearwardly, opening a communication from the channel 5 to the channel 22 which will permit the escape of the fluid from the pump into the return connection 23 leading to the reservoir 1. The fluid in the chambers 20 and 15 will be forced on the unseating of the valve 18 into the bores 26, 27 and 28 from where it will enter the return connection 23. On the pressure in the accumulator 8 falling slightly below normal, the spring 29 will force the piston 10 forward, seating the end of the contracted portion 14 in its seat 16, and with the apertures 24 a slight distance beyond the end of the controlling member 33, at which time a direct fluid connection will be established from the connection 25 through the bores 10' and 17 into the chamber 20, and the pressure of the fluid on the enlarged portion 19 of the valve 18 will seat and maintain the same seated until such time as the excess pressure in the system moves the piston rearwardly.

It will be apparent that I have provided a valve which is capable of adjustment to operate under various pressures and which is also capable of opening or closing its full distance very rapidly, thereby providing a full outlet opening for the escape of the fluid, which will reduce to a minimum the heating thereof on escaping from the pump.

It will be apparent that by contracting the portion 14 of the tubular extension 11, as in the drawings, that a shoulder A is provided, which receives a pressure of the fluid through the apertures 24, and the pressure of the fluid on this surface acts with the spring 29 in maintaining the end of the contracted portion seated in the seat 16, but when pressure is cut off through the apertures 24 by the rearward movement of the piston 10, the pressure on the shoulder A is suddenly destroyed which permits the pressure of the fluid on the forward surface of the piston to rapidly move the same rearwardly.

Having thus described my invention what I claim as new and desire to protect by Letters Patent is:—

1. In a valve structure of the class described, the same comprising a valve casing, formed with a channel for connection to a source of fluid supply under pressure and to a pressure accumulating chamber for containing fluid under pressure, a fluid escape channel formed in said casing, a valve open at its forward end to the pressure in said first mentioned channel and controlling a communication from said first mentioned channel to said fluid escape channel and seated to close said communication by the pressure of the fluid against the rear of the same, and means operated by the fluid in the first mentioned channel on the same attaining a determinable pressure for cutting off the fluid pressure to the rear of said valve and for releasing the same from in rear of the valve to permit the fluid pressure in said first mentioned channel to act directly on and unseat said valve and escape through said fluid escape channel.

2. In a valve structure of the class described, the same comprising a valve casing formed with a channel for connection to a source of fluid supply under pressure and to a pressure accumulating chamber for containing fluid under pressure, a fluid escape channel formed in said casing, a valve exposed at its forward end to the pressure in said first mentioned channel and controlling a communication from said first mentioned channel to said fluid escape channel, a fluid connection from said first mentioned channel to a point in rear of said valve for admitting fluid under pressure to the rear of said valve for seating the same, means operated in one direction by the pressure of the fluid in said first mentioned channel on the same attaining a determinable pressure for cutting off the fluid pressure to the rear of said valve and for releasing the same from the rear of said valve to permit the fluid pressure in said first mentioned channel to act directly on and unseat said valve and escape through said fluid escape channel, and spring pressed means for operating said last mentioned means in the opposite direction on the reducing of said fluid pressure below a determinable pressure.

3. In a valve structure of the class described, the same comprising a valve casing formed with a channel for connection to a source of fluid supply under pressure and to a pressure accumulating chamber for containing fluid under pressure, a fluid escape channel formed in said casing, a valve exposed at its forward end to the pressure in said first mentioned channel and controlling a communication from said first mentioned channel to said fluid escape channel, a fluid connection leading from said first mentioned channel to a point in rear of said valve, a piston in said fluid connection, a spring for normally maintaining said piston seated to permit the flow of the fluid to the rear of said valve to maintain the same seated, said piston being unseated by the pressure of the fluid in the first mentioned channel on the same attaining a given pressure to act directly on and cut off the flow of the fluid pressure to the rear of said valve and for releasing the same from the rear of said valve, to permit the fluid pressure in said first mentioned channel to unseat said valve and escape through said fluid escape channel.

4. In a valve structure of the class described, the same comprising a valve casing provided with a channel for connection to a source of fluid supply under pressure and to a pressure accumulating chamber for containing fluid under pressure, a fluid escape channel formed in said casing, a pressure controlled valve exposed at its forward end to the pressure in said first mentioned channel and controlling a communication from said first mentioned channel to said fluid escape channel, a fluid connection leading from said first mentioned channel to a point in rear of said valve, and a pressure operated valved piston for controlling the flow of the fluid from said fluid connection to the rear of said valve.

5. In a valve structure of the class described, the same comprising a valve casing provided with a channel for connection to a source of fluid supply and to a pressure accumulating chamber for containing fluid under pressure, a fluid escape channel formed in said casing, a pressure operated valve exposed at its forward end to the pressure in said first mentioned channel and controlling a communication from said first mentioned channel to said fluid escape channel, a fluid connection leading from said first mentioned channel to a point in rear of said valve, a fluid pressure escape channel formed in said casing at the rear of said valve, and a spring seated pressure operated valved piston in said casing and adapted when seated for admitting a flow of fluid from said first mentioned channel through said connection to the rear of said valve for seating the same and when unseated for cutting off the flow of the fluid to the rear of said valve and for opening the pressure escape channel at the rear of said valve.

6. In a valve of the class described, the same comprising a valve casing provided with a channel adapted for connection to a fluid supply under pressure and a fluid pressure accumulating chamber, a fluid pressure release port formed in said casing, a pressure controlled valve in said casing and controlling a communication between said first mentioned channel to said release port, a fluid conduit leading from said first mentioned channel to a point in rear of said valve, a member in said casing intermediate said conduit and said valve and formed with a fluid opening leading to the rear of said valve and a fluid release opening, a fluid operated piston mounted in said casing and provided with a tubular extension open at its outer end, said extension provided with fluid inlet apertures in its side walls, means for normally maintaining said tubular extension in direct connection with said fluid opening, and adjustable means for regulating the closing of said inlet apertures on the movement of said piston.

7. In a valve of the class described, the same comprising a valve casing provided with a channel for connection to a fluid supply under pressure and to a fluid pressure accumulating chamber, a fluid pressure release port formed in said casing, a fluid escape communication between said first mentioned channel and said fluid pressure release port, a pressure actuated valve exposed at its forward end to the pressure in said first mentioned channel and controlling said communication between said first mentioned channel and said release port, a fluid conduit leading from said first mentioned channel to a point in rear of said valve, said valve provided with an enlarged rear area normally open to the fluid pressure from said conduit which normally maintains said valve seated, and fluid operated means for cutting off the flow of the fluid to the rear of said valve and for releasing the pressure behind the same to permit the direct pressure in said first mentioned channel to unseat said valve and escape through said fluid escape channel.

8. In a valve structure of the class described, the same comprising a valve casing provided with a channel for connection to a source of fluid supply under pressure and to a pressure accumulating chamber, a fluid escape channel formed in said casing, a pressure controlled valve for controlling a communication from said first mentioned channel to said fluid escape channel, a fluid connection leading from said first mentioned channel to a point in rear of said valve, and a pressure operated valved piston formed to present different fluid pressure areas to the pressure of fluid from said fluid connection when seated and unseated, and adapted for controlling the flow of fluid from said fluid connection to the rear of said valve.

In testimony whereof I have signed my name to this specification in the presence of two subscribing witnesses.

CHESTER B. McAULAY.

Witnesses:
HARRY H. TOTTEN,
D. B. RICHARDS.